(12) United States Patent
Watanabe

(10) Patent No.: US 12,045,342 B2
(45) Date of Patent: Jul. 23, 2024

(54) INFORMATION PROCESSING DEVICE, DISPLAY METHOD, AND NON-TRANSITORY COMPUTER READABLE MEDIUM

(71) Applicant: NEC Corporation, Tokyo (JP)

(72) Inventor: Masafumi Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/767,558

(22) PCT Filed: Oct. 28, 2019

(86) PCT No.: PCT/JP2019/042097
§ 371 (c)(1),
(2) Date: Apr. 8, 2022

(87) PCT Pub. No.: WO2021/084567
PCT Pub. Date: May 6, 2021

(65) Prior Publication Data
US 2024/0086523 A1 Mar. 14, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......... G06F 21/554; G06F 2221/034
USPC ..................... 726/22–25
See application file for complete search history.

(56) References Cited

U.S. PATENT DOCUMENTS

| 9,374,380 | B2 * | 6/2016 | Neil | H04L 63/1425 |
| 9,794,274 | B2 * | 10/2017 | Sakurai | H04L 63/1416 |
| 10,140,447 | B2 * | 11/2018 | Rahaman | G06F 21/566 |
| 10,282,542 | B2 * | 5/2019 | Kawauchi | G06F 21/577 |

(Continued)

FOREIGN PATENT DOCUMENTS

| JP | 5353182 B2 | 11/2013 |
| JP | 2015-121968 A | 7/2015 |

(Continued)

OTHER PUBLICATIONS

International Search Report for PCT Application No. PCT/JP2019/042097, mailed on Jan. 26, 2020.

*Primary Examiner* — Amare F Tabor
(74) *Attorney, Agent, or Firm* — Sughrue Mion, PLLC

(57) ABSTRACT

An information processing device (10) includes an anomaly receiving means (11) for receiving an anomaly detected by a monitoring device installed in a control system, a collating means (12) for receiving the anomaly from the anomaly receiving means (11), making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event, and an extracting means (13) for extracting an event matching a predetermined extraction condition from the specified attack procedure.

18 Claims, 20 Drawing Sheets

(56) References Cited

U.S. PATENT DOCUMENTS

| | | | | |
|---|---|---|---|---|
| 10,503,902 | B2* | 12/2019 | Chen | G06F 21/52 |
| 10,778,699 | B1* | 9/2020 | Bradley | H04L 63/1441 |
| 10,789,367 | B2* | 9/2020 | Joseph Durairaj | G06N 3/043 |
| 10,872,147 | B2* | 12/2020 | Furukawa | G06F 21/577 |
| 2015/0205956 | A1 | 7/2015 | Sakurai et al. | |
| 2016/0036837 | A1* | 2/2016 | Jain | H04L 63/1416 |
| | | | | 726/23 |
| 2016/0036838 | A1* | 2/2016 | Jain | H04L 63/1416 |
| | | | | 726/23 |
| 2018/0330083 | A1 | 11/2018 | Abbaszadeh et al. | |
| 2020/0314130 | A1* | 10/2020 | Nakai | H04L 63/1425 |
| 2021/0117538 | A1* | 4/2021 | Ono | G06F 21/568 |
| 2021/0237665 | A1 | 8/2021 | Tamura et al. | |
| 2022/0053020 | A1* | 2/2022 | Buyukcorak | H04W 12/122 |

FOREIGN PATENT DOCUMENTS

| | | |
|---|---|---|
| JP | 5793395 B2 | 10/2015 |
| JP | 2019-046207 A | 3/2019 |
| JP | 2019-125344 A | 7/2019 |
| WO | 2014/045827 A1 | 3/2014 |

* cited by examiner (1) Anomaly-Type: TAMPER_DETECTED
Equipment-Name: MV101
Equipment-Category: FIELD_DEVICE

Fig. 5A (2)
```
Anomaly-Type: UNUSUAL_MESSAGE
Message-Class: Write-Tag-Value
Equipment-Name: LIT101
Value: L
```

```
Attack-Path: AP1

Event-Number: 1
    Event-Type: COMPROMISED
    Target: EWS
    Label: EWS was infected with malware and compromised by an attacker.

Event-Number: 2
    Event-Type: PASSWORD_STOLEN
    Target: EWS
    Label: User name and password was stolen by the attacker.

Event-Number: 3
    Event-Type: LOGIN_BY_ATTACKER
    Target: HMI
    Label: Attacker logged in the HMI.

Event-Number: 4
    Event-Type: TAG_CHANGED_BY_ATTACKER
    Target: LIT101
    Reporting-State: L
    Label: Attacker changed tag value for LIT101 remotely.

Event-Number: 5
    Event-Type: SEND_COMMAND
    Subject: PLC
    Target: PMP101
    Command: START
    Label: PLC tells PMP101 to START.

Event-Number: 6
    Event-Type: FUNCTIONED
    Subject: PMP101
    Command: START
    Physical-State: RUNNING
    Reporting-State: RUNNING
    Comment: PMP101 is actually RUNNING.

Event-Number: 7
    Event-Type: PHYSICALLY_CHANGED
    Subject: WT001
    Physical-State: HH
    Label: HH at WT001.

Event-Number: 8
    Event-Type: PHYSICALLY_CHANGED
    Subject: WT001
    Physical-State: OVERFLOW
    Label: OVERFLOW at WT001.
```

```
Attack-Path: AP2

Event-Number: 1
  Event-Type: PHYSICALLY_ACCESSED
  Target: MV101
  Label: MV101 is physically accessed by attacker.

Event-Number: 2
  Event-Type: COMPROMISED
  Target: MV101
  Label: Software in MV101 is modified by attacker.

Event-Number: 3
  Event-Type: MALFUNCTIONED
  Subject: MV101
  Physical-State: OPEN
  Reporting-State: CLOSED
  Comment: MV101 is actually OPEN.

Event-Number: 4
  Event-Type: PHYSICALLY_CHANGED
  Subject: WT001
  Physical-State: LL
  Label: LL at WT001.

Event-Number: 5
  Event-Type: PHYSICALLY_CHANGED
  Subject: WT001
  Physical-State: EMPTY
  Label: EMPTY at WT001.
```

Fig. 6B

```
Attack-Path: AP3

Event-Number: 1
    Event-Type: MALICIOUS_HOST_JOINED
    Label: A malicious host is joined to conduct man-in-the-middle attack.

Event-Number: 2
    Event-Type: TAG_CHANGED_BY_ATTACKER
    Target: LIT101
    Reporting-State: H
    Label: Attacker changed tag value for LIT101 remotely.

Event-Number: 3
    Event-Type: SEND_COMMAND
    Subject: PLC
    Target: MV101
    Command: OPEN
    Label: PLC tells MV101 to OPEN.

Event-Number: 4
    Event-Type: FUNCTIONED
    Subject: MV101
    Command: OPEN
    Physical-State: OPEN
    Reporting-State: OPEN
    Label: MV101 is actually OPEN.

Event-Number: 5
    Event-Type: PHYSICALLY_CHANGED
    Subject: WT001
    Physical-State: LL
    Label: LL at WT001.

Event-Number: 6
    Event-Type: PHYSICALLY_CHANGED
    Subject: WT001
    Physical-State: EMPTY
    Label: EMPTY at WT001.
```

```
Attack-Path: AP4

Event-Number: 1
    Event-Type: COMPROMISED
    Target: EWS
    Label: EWS was infected with malware and compromised by an attacker.

Event-Number: 2
    Event-Type: PASSWORD_STOLEN
    Target: EWS
    Label: User name and password was stolen by the attacker.

Event-Number: 3
    Event-Type: LOGIN_BY_ATTACKER
    Target: HMI
    Label: Attacker logged in the HMI.

Event-Number: 4
    Event-Type: TAG_CHANGED_BY_ATTACKER
    Target: LIT101
    Reporting-State: H
    Label: Attacker changed tag value for LIT101 remotely.

Event-Number: 5
    Event-Type: SEND_COMMAND
    Subject: PLC
    Target: MV101
    Command: OPEN
    Label: PLC tells MV101 to OPEN.

Event-Number: 6
    Event-Type: FUNCTIONED
    Subject: MV101
    Command: OPEN
    Physical-State: OPEN
    Reporting-State: OPEN
    Comment: MV101 is actually OPEN.

Event-Number: 7
    Event-Type: PHYSICALLY_CHANGED
    Subject: WT001
    Physical-State: LL
    Label: LL at WT001.

Event-Number: 8
    Event-Type: PHYSICALLY_CHANGED
    Subject: WT001
    Physical-State: EMPTY
    Label: EMPTY at WT001.
```

| COLLATING CONDITION ID | ANOMALY COLLATING CONDITIONAL EXPRESSION | EVENT COLLATING CONDITIONAL EXPRESSION |
|---|---|---|
| CC1 | Anomaly-Type = UNUSUAL_MESSAGE and Target = $X | Event-Type = TAG_CHANGED_BY_ATTACKER and Target = $X |
| CC2 | Anomaly-Type = UNUSUAL_LOGIN and Target = $X | Event-Type = LOGIN_BY_ATTACKER and Target = $X |
| CC3 | Anomaly-Type = TAMPER_DETECTED and Equipment-Name = $X | Event-Type = COMPROMISED and Target = $X |

Fig. 7

| EXTRACTION CONDITION ID | EVENT EXTRACTION CONDITIONAL EXPRESSION | LABEL |
|---|---|---|
| EC1 | Event-Number < @MATCHED_EVENT_NUMBER | CAUSE LEADING TO OCCURRENCE OF ANOMALY |
| EC2 | Event-Number > @MATCHED_EVENT_NUMBER | EXPECTED CONSEQUENCE AFTER OCCURRENCE OF ANOMALY |

Fig. 8

INFORMATION PROCESSING DEVICE, DISPLAY METHOD, AND NON-TRANSITORY COMPUTER READABLE MEDIUM

This application is a National Stage Entry of PCT/JP2019/042097 filed on Oct. 28, 2019, the contents of all of which are incorporated herein by reference, in their entirety.

TECHNICAL FIELD

The present invention relates to an information processing device and a display method for maintaining the security of a control system, and further relates to a program for executing the same.

BACKGROUND ART

A control system for controlling a plant is needed in a factory, an electric power plant, an electric power substation, a water treatment plant and the like. Such a control system includes a PLC (Programmable Logic Controller), an engineering work station (management device) that manages and maintains the PLC, and a terminal device or the like that provides an operator with an HMI (Human Machine Interface).

The PLC activates an actuator or the like on the basis of sensor data from a sensor placed in each part of a facility. The PLC operates according to a control program provided from the engineering work station. Further, since the value of sensor data, the operating status of the actuator and the like are displayed on the HMI, the operator is able to monitor the running status of the facility through the HMI.

Patent Literature 1 discloses a technique to solve a problem that it takes a long time to find the cause in the event of a process anomaly (particularly, when the cause for a trouble occurs at a position slightly distant from the position of collecting process data). This technique displays a time-series screen such as trend display, alarm history display, controlling and operating history display, operator log history on a process flow screen, and displays those entire display screens in synchronization with the playback time by a playback function.

Patent Literature 2 discloses a technique to provide a data analysis support device, a data analysis support method, a computer program, and a recording medium that allow appropriate analysis data to be obtained easily in the event of an operation anomaly. This technique previously selects operation history data that is considered to be related to an operation anomaly, and records an operation anomaly item and one or a plurality of related data items (specification of an item of related operation history data) related to this operation anomaly item as one set.

A recent issue is misoperation or malfunction occurring in equipment constituting a control system due to cyberattacks, which causes damage to human life, facilities and the like. To ensure security, introduction of a monitoring device that monitors various anomalies in a control system is in progress. Examples of the monitoring device include a device that monitors tampering of software installed in equipment such as a sensor or an actuator, a device that monitors an anomaly in a message flowing in a network, and a device that monitors an anomaly in a process on the basis of the reading state of a sensor or the operating state of an actuator.

CITATION LIST

Patent Literature

Patent Literature 1: Japanese Patent No. 5793395
Patent Literature 2: Japanese Patent No. 5353182

SUMMARY OF INVENTION

Technical Problem

When the monitoring device detects an anomaly, information first given to a person in charge of operation is this anomaly only. The person in charge of operation needs to estimate, from this anomaly, (A) causes leading to the occurrence of the anomaly and (B) expected consequences after the occurrence of the anomaly on the basis of their knowledge and experience. Further, the person in charge of operation needs to comprehensively determine the level of risk that is actually about to occur in the control system on the basis of the above (A) and (B). When it is determined that the level of risk exceeds an allowable limit, the person in charge of operation needs to immediately take a measure avoid or reduce the risk.

The above-described determination work depends in no small part on the knowledge and experience of the person in charge of operation. This causes a problem that the person in charge of operation cannot promptly determine the level of risk or can make a wrong determination.

The techniques disclosed in Patent Literatures 1 and 2 are to efficiently present, to a person in charge of operation, process data acquired in the past from a control system where an anomaly is to be monitored, and the person in charge of operation needs to estimate causes leading to the occurrence of the anomaly and expected consequences after the occurrence of the anomaly on the basis of their knowledge and experience.

An example of the object of the example embodiment disclosed in this specification is to solve the above problem and provide an information processing device, a display method, and a program for maintaining the security of a control system.

Solution to Problem

To solve the above problem, an information processing device according to a first aspect includes an anomaly receiving means for receiving an anomaly detected by a monitoring device installed in a control system; a collating means for receiving the anomaly from the anomaly receiving means, making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and an extracting means for extracting an event matching a predetermined extraction condition from the specified attack procedure.

Further, to solve the above problem, an display method according to a second aspect includes (a) receiving an anomaly detected by a monitoring device installed in a control system; (b) receiving the received anomaly, making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and (c) extracting an event matching a predetermined extraction condition from the specified attack procedure.

To solve the above problem, a non-transitory computer readable medium according to a third aspect stores a program containing instructions causing a computer to execute (a) a step of receiving an anomaly detected by a monitoring device installed in a control system; (b) a step of receiving the received anomaly, making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and (c) a step of extracting an event matching a predetermined extraction condition from the specified attack procedure.

Advantageous Effects of Invention

According to the above-described aspect, for an anomaly detected by a monitoring device, (A) causes leading to the occurrence of the anomaly or (B) expected consequences after the occurrence of the anomaly are automatically presented to a person in charge of operation.

BRIEF DESCRIPTION OF DRAWINGS

FIG. 5A is a view showing an example of an anomaly received from a monitoring device by an anomaly receiving means according to the example embodiment of the present invention.

FIG. 5B is a view showing an example of an anomaly received from a monitoring device by the anomaly receiving means according to the example embodiment of the present invention.

FIG. 6A is a view showing an example of an attack path stored in a risk storing means according to the example embodiment of the present invention.

FIG. 6B is a view showing an example of an attack path stored in the risk storing means according to the example embodiment of the present invention.

FIG. 6C is a view showing an example of an attack path stored in the risk storing means according to the example embodiment of the present invention.

FIG. 6D is a view showing an example of an attack path stored in the risk storing means according to the example embodiment of the present invention.

FIG. 7 is a view showing an example of collating conditions stored in a collating condition storing means according to the example embodiment of the present invention.

FIG. 8 is a view showing an example of extraction conditions stored in an extraction condition storing means according to the example embodiment of the present invention.

DESCRIPTION OF EMBODIMENTS

Example Embodiment

An information processing device, a display method, and a program according to an example embodiment of the present invention are described hereinafter with reference to the drawings.
[Device Configuration]

Figure 1:
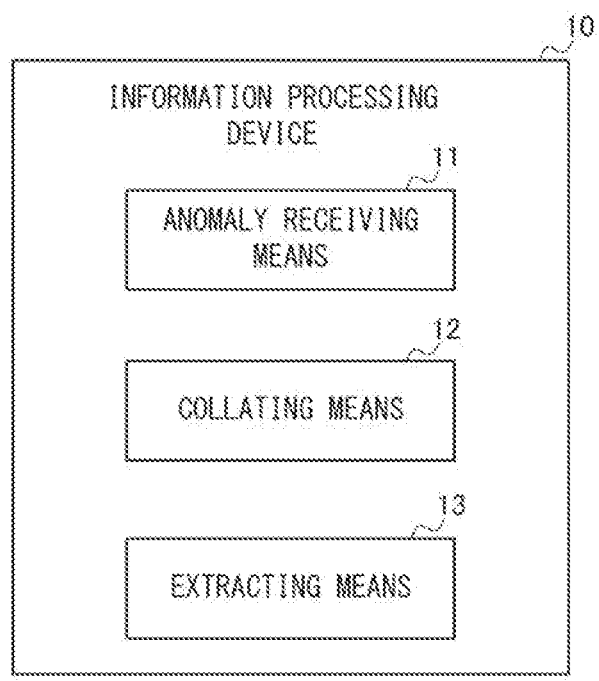
FIG. 1 is a block diagram showing a schematic configuration of an information processing device according to an example embodiment of the present invention.

First, a schematic configuration of an information processing device according to an example embodiment is described with reference to FIG. 1. FIG. 1 is a block diagram showing a schematic configuration of an information processing device according to an example embodiment of the present invention.

An information processing device 10 according to this example embodiment shown in FIG. 1 is a device that, for an anomaly detected by a monitoring device installed in a control system, automatically extracts (A) causes leading to the occurrence of the anomaly or (B) expected consequences after the occurrence of the anomaly, and thereby supports determining the level of risk that is actually about to occur in the control system. As shown in FIG. 1, the information processing device 10 includes an anomaly receiving means 11, a collating means 12, and an extracting means 13.

The anomaly receiving means 11 receives an anomaly detected by the monitoring device. The collating means 12 receives the anomaly from the anomaly receiving means 11, and makes a first determination that determines whether this anomaly matches each of predetermined collating conditions for collating an event contained in an attack procedure and the anomaly. Further, when the first determination results in a match, the collating means 12 makes a second determination that determines whether an event contained in each of predefined attack procedures matches the collating condition determined to match the anomaly. When the second determination results in a match, the collating means 12 specifies an attack procedure containing this event and passes it to the extracting means 13. The extracting means 13 receives the specified attack procedure containing the event that matches the collating condition from the collating means 12, and extracts an event that matches a predetermined extraction condition from the attack procedure.

As described above, the information processing device 10 according to this example embodiment is able to automatically extract, for an anomaly detected by a monitoring device, (A) causes leading to the occurrence of the anomaly and (B) expected consequences after the occurrence of the anomaly.

Figure 2:
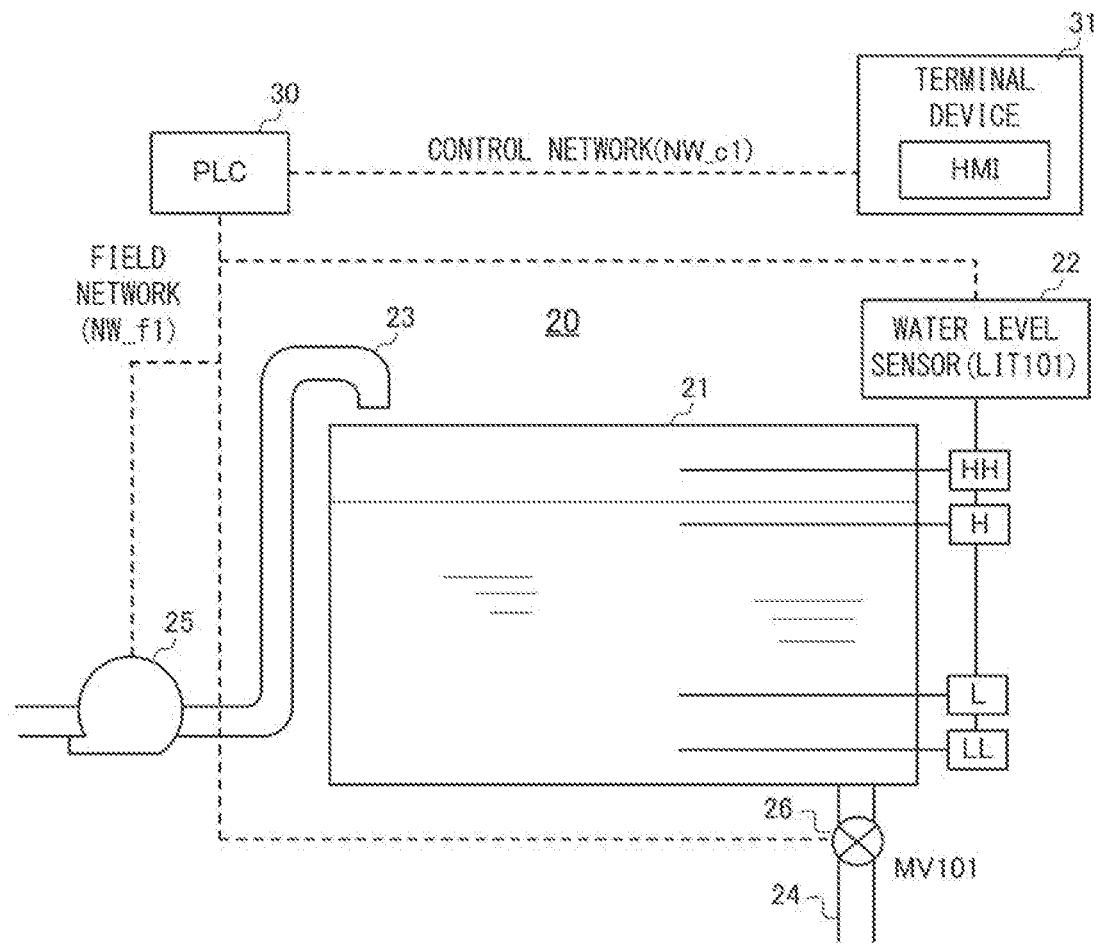
FIG. 2 is a configuration diagram showing a configuration of a plant for which an anomaly is to be monitored and a risk is to be displayed in the example embodiment of the present invention.
Figure 3:
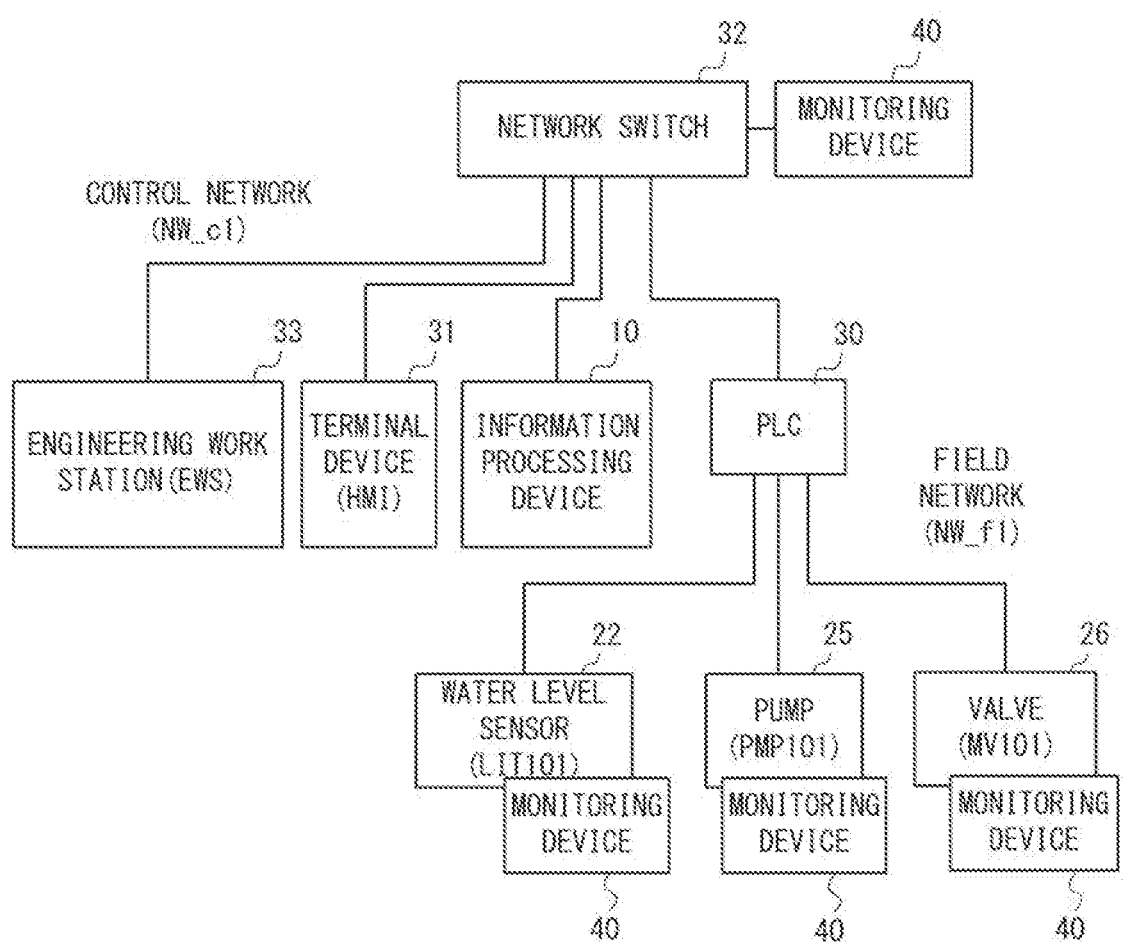
FIG. 3 is a block diagram showing the relationship between the information processing device according to the example embodiment of the present invention and a control system of the plant shown in FIG. 2.
Figure 4:
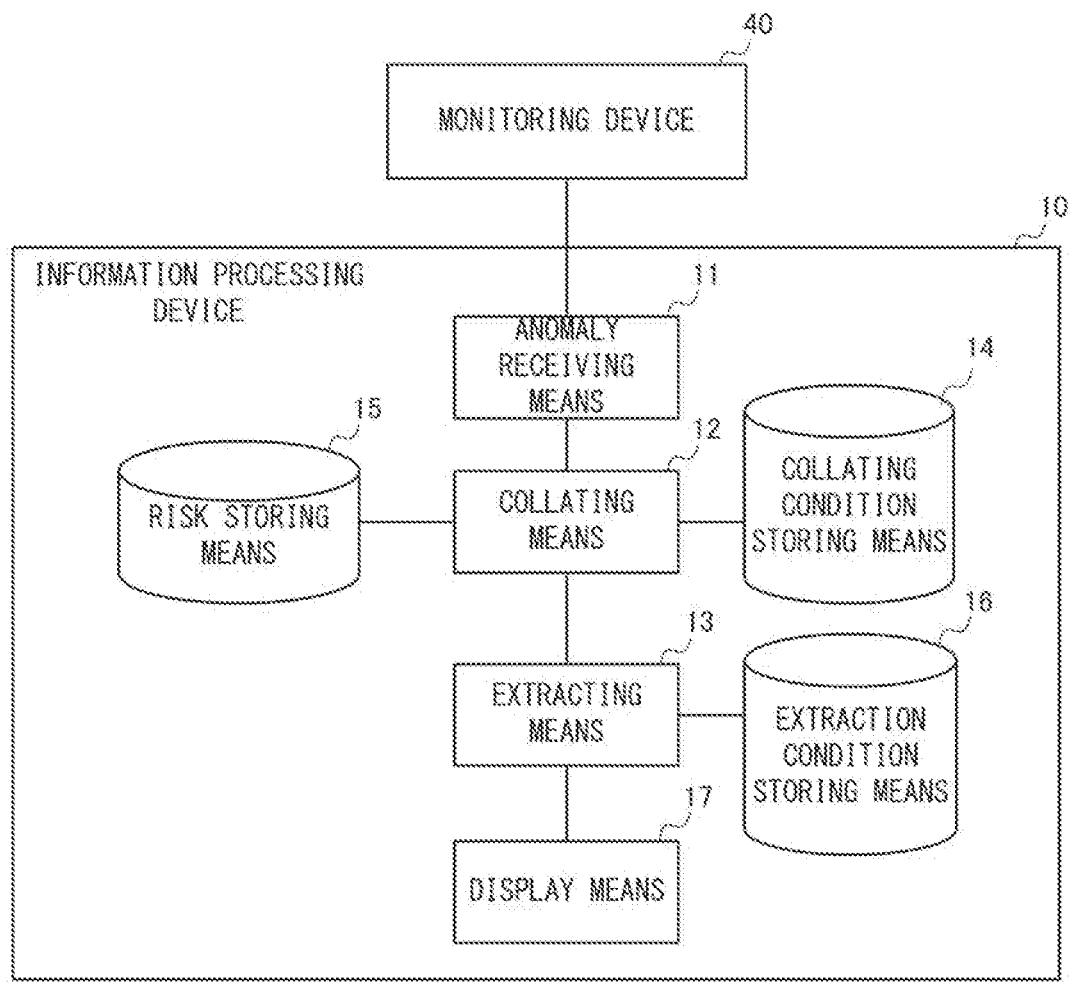
FIG. 4 is a block diagram more specifically showing a configuration of the information processing device according to the example embodiment of the present invention.

A configuration and functions of the information processing device according to this example embodiment are specifically described hereinafter with reference to FIGS. 2 to 4. FIG. 2 is a configuration diagram showing an example of a configuration of a plant for which an anomaly is to be monitored and a risk is to be displayed in the example embodiment of the present invention. FIG. 3 is a block diagram showing the relationship between the information processing device according to the example embodiment of the present invention and a control system of the plant shown in FIG. 2. FIG. 4 is a block diagram more specifically showing a configuration of the information processing device according to the example embodiment of the present invention.

As shown in FIG. 2, in this example embodiment, a plant 20 includes a water storage tank 21, a water level sensor (LIT 101) 22, a supply line 23, a drain line 24, a pump (PMP101) 25, and a valve (MV101) 26. Further, the plant 20 includes, as a control device, a PLC (PLC1) 30 that executes a control program. The water level sensor 22 measures the level of water stored in the water storage tank 21 on four scales (HH, H, L, LL), and outputs sensor data indicating the measured water level. The supply line 23 is a line for supplying water to the water storage tank 21. The pump 25 is mounted on the supply line 23. The drain line 24 is a line for draining water in the water storage tank 21. The valve 26 is mounted on the drain line 24. The PLC 30 adjusts the water level by activating the pump 25 or opening and closing the valve 26 according to the sensor data output from the water level sensor 22.

Further, as shown in FIG. 3, in the plant 20, the PLC 30 is connected for data communication to an engineering work station 33 and a terminal device 31 that is used by an operator through a network switch 32 and a control network (NW_c1). The PLC 30 is also connected to the information processing device 10 through the network switch 32 and the control network (NW_c1).

Further, a monitoring device 40 capable of detecting tampering of software installed in each device is connected to each of the water level sensor 22, the pump 25, and the valve 26. A monitoring device 40 capable of detecting an anomaly in a message flowing in the network is connected to the network switch 32.

The terminal device 31 provides an operator with HMI. The operator performs operations on the HMI of the terminal device 31. The engineering work station 33 manages the operating state of each PLC and further stores its control program. Further, the engineering work station 33 updates the control program in response to a command of the operator or the like.

Further, as shown in FIG. 3, the PLC 30 is connected to the water level sensor 22, the pump 25, and the valve 26 through a field network (NW_f1). In this manner, in this example embodiment, the plant 20 for which an anomaly is to be monitored and a risk is to be displayed includes the PLC that executes the control program and the network that connects the PLC with another device.

Note that a signal that reports the state and the like of a manufacturing process received from a sensor and the like by the PLC 30 is written into a location corresponding to this signal in a storage device included in this PLC. Further, a signal that activates or stops an actuator or the like that is transmitted to the actuator or the like by the PLC is read from a location corresponding to this signal in the storage device included in this PLC. A location in the storage device is generally called a variable, a tag, a register and so on, and it is referred to as a tag in this example embodiment.

Further, the configuration of the information processing device 10 according to this example embodiment is described more specifically with reference to FIG. 4. As shown in FIG. 4, the information processing device 10 includes a collating condition storing means 14, a risk storing means 15, an extraction condition storing means 16, and a display means 17 in addition to the anomaly receiving means 11, the collating means 12, and the extracting means 13 shown in FIG. 1.

In this example embodiment, the anomaly receiving means 11 receives, from the monitoring devices 40 shown in FIG. 3, an anomaly detected by those devices. FIGS. 5A and 5B show examples of an anomaly received from the monitoring device 40 by the anomaly receiving means 11 in the example embodiment of the present invention. An anomaly is composed of one or more pairs of a key and a value.

The anomaly (1) in FIG. 5A is an example of an anomaly that is transmitted when the monitoring devices 40 detects tampering of software installed in the valve 26 to be monitored. The key "Anomaly-Type" indicates a type of an anomaly, and its value "TAMPER_DETECTED" indicates that tampering of software installed in equipment to be monitored is detected. Further, the value "MV101" of the key "Equipment-Name" indicates that tampering of software installed in the valve (MV101) 26 is detected.

The anomaly (2) in FIG. 5B is an example of an anomaly that is transmitted when the monitoring devices 40 detects a suspicious message flowing in the control network (NW_c1) to be monitored. The key "Anomaly-Type" indicates a type of an anomaly, and its value "UNUSUAL_MESSAGE" indicates that a suspicious message is detected in the network to be monitored. Further, the value "Write-Tag-Value" of the key "Message-Class" indicates that this suspicious message is a message that requests rewriting of a tag value. Further, the value "LIT101" of the key "Equipment-Name" and the value "L" of the key "Value" indicate rewriting of a value of the tag related to the water level sensor (LIT 101) 22 to "L".

The risk storing means 15 stores risks that can occur in the plant 20. A risk in this example embodiment is written as an attack path. Specifically, in this example embodiment, an attack procedure is written as an attack path. The attack path is information where events that can occur when the plant 20 encounters a cyberattack are arranged in a time series. The attack path in this example embodiment is created by an expert for security and control systems who examines the vulnerability of each equipment in the plant 20 and studies all possible cases that damage the plant 20 by abusing the vulnerability.

FIGS. 6A to 6D show examples of attack paths stored in the risk storing means 15. An attack path contains events arranged in a time series. An event is composed of one or more pairs of a key and a value. A value of the key "Event-Number" indicates in what ordinal position the event occurs in the attack path. A value of the key "Event-Type" indicates a type of this event. A sentence that describes the event is stored in a value of the key "Label".

The event type "COMPROMISED" indicates an event where an attacker has become able to freely control equipment, and the details of this event can be described in the next key. A value of the key "Target" contains an identification name of the equipment which the attacker becomes able to freely control.

The event type "PASSWORD_STOLEN" indicates an event where an attacker has stolen user authentication information such as a password from equipment, and the details of this event can be described in the next key. A value of the key "Target" contains an identification name of the equipment from which the attacker steals user authentication information such as a password.

The event type "LOGIN_BY_ATTACKER" indicates an event where an attacker has logged in to equipment, and the details of this event can be described in the next key. A value of the key "Target" contains an identification name of the equipment to which the attacker has logged in.

The event type "TAG_CHANGED_BY_ATTACKER" indicates an event where an attacker has changed a tag value, and the details of this event can be described in the next key. A value of the key "Target" contains an identification name of equipment corresponding to the tag whose value has been changed by the attacker. Thus, a value of the key "Target" indicates for which equipment the attacker has changed a tag value. Further, a tag can have a plurality of values, and a value of the key "Reporting-State" contains a sensor reading report value written by the attacker.

The event type "SEND_COMMAND" indicates an event where certain equipment has sent a command to other equipment, and the details of this event can be described in the next key. A value of the key "Subject" contains an identification name of the equipment that has sent the command. A value of the key "Target" contains an identification name of the equipment that has received the command. A value of the key "Command" contains an identification name of the command sent.

The event type "FUNCTIONED" indicates an event where certain equipment functions normally in response to a command, and the details of this event can be described in the next key. A value of the key "Subject" contains an identification name of the equipment that functions normally in response to the command. A value of the key "Command" contains an identification name of the command. A value of the key "Physical-State" contains an identification name of the physical state of the equipment that functions normally in response to the command. A value of the key "Reporting-State" contains a sensor reading report value of the equipment that functions normally in response to the command.

The event type "PHYSICALLY_CHANGED" indicates an event where the physical state of a facility has changed, and the details of this event can be described in the next key. A value of the key "Subject" contains an identification name of the facility whose physical state has changed. A value of the key "Physical-State" contains a physical state value of the facility.

The event type "PHYSICALLY_ACCESSED" indicates an event where an attacker has become physically accessible to equipment, and the details of this event can be described in the next key. A value of the key "Target" contains an identification name of the equipment which the attacker has become able to physically access.

The event type "MALFUNCTIONED" indicates an event where equipment does not function normally, and the details of this event can be described in the next key. A value of the key "Subject" contains an identification name of the equipment that does not function normally. A value of the key "Physical-State" contains a physical state value of the equipment that does not function normally. A value of the key "Reporting-State" contains a sensor reading report value of the equipment that does not function normally.

The event type "MALICIOUS_HOST_JOINED" indicates an event where malicious equipment has connected to the network.

As described above, the attack path "AP1" shown in FIG. 6A is information indicating that the following events can occur in the plant 20. First, a first event where an attacker becomes able to freely control the engineering work station (EWS) 33 occurs. Next, a second event where the attacker steals user authentication information from the engineering work station (EWS) 33 occurs. Then, a third event where the attacker logs in to the terminal device (HMI) 31 occurs. After that, a fourth event where the attacker changes a sensor reading report value of the water level sensor (LIT 101) 22 to "L" occurs. Then, a fifth event where the PLC 30 sends a command "START" to the pump (PMP101) occurs. After that, a sixth event where the physical state of the pump (PMP101) 25 becomes "RUNNING" in response to the command "START" and the sensor reading report value also becomes "RUNNING" occurs. Then, a seventh event where the physical state of the water storage tank 21 changes to "HH" occurs. Finally, an eighth event where the physical state of the water storage tank 21 changes to "OVERFLOW" occurs.

The attack path "AP2" shown in FIG. 6B is information indicating that the following events can occur in the plant 20. First, a first event where an attacker becomes physically accessible to the valve (MV101) 26 occurs. Next, a second event where the attacker becomes able to freely control the valve (MV101) 26 occurs. Then, a third event where the valve (MV101) 26 does not function normally, and the physical state of this valve becomes "OPEN" while a sensor reading report value of this valve is "CLOSED" occurs. After that, a fourth even where the physical state of the water storage tank 21 changes to "LL" occurs. Finally, a fifth event where the physical state of the water storage tank 21 changes to "EMPTY" occurs.

The attack path "AP3" shown in FIG. 6C is information indicating that the following events can occur in the plant 20. First, a first event where malicious equipment is connected to the control network (NW_c1) occurs. Next, a second event where an attacker changes a sensor reading report value of the water level sensor (LIT 101) 22 to "H" occurs. Then, a third event where the PLC 30 sends a command "OPEN" to the valve (MV101) 26 occurs. After that, a fourth event where the physical state of the valve (MV101) 26 becomes "OPEN" in response to the command "OPEN" and the sensor reading report value also becomes "OPEN" occurs. Then, a fifth event where the physical state of the water storage tank 21 changes to "LL" occurs. Finally, a sixth event where the physical state of the water storage tank 21 changes to "EMPTY" occurs.

The attack path "AP4" shown in FIG. 6D is information indicating that the following events can occur in the plant 20. First, a first event where an attacker becomes able to freely control the engineering work station (EWS) 33 occurs. Next, a second event where the attacker steals user authentication information from the engineering work station (EWS) 33 occurs. Then, a third event where the attacker logs in to the terminal device (HMI) 31 occurs. After that, a fourth event where the attacker changes a sensor reading report value of the water level sensor (LIT 101) 22 to "H" occurs. Then, a fifth event where the PLC 30 sends a command "OPEN" to the valve (MV101) 26 occurs. After that, a sixth event where the physical state of the valve (MV101) 26 becomes "OPEN" in response to the command "OPEN" and the sensor reading report value also becomes "OPEN" occurs. Then, a seventh event where the physical state of the water storage tank 21 changes to "LL" occurs. Finally, an eighth event where the physical state of the water storage tank 21 changes to "EMPTY" occurs.

The collating condition storing means 14 stores collating conditions that define the relationship between an anomaly received by the anomaly receiving means 11 and an event contained in each attack path stored in the risk storing means 15. Specifically, a collating condition is a condition for collating an event contained in an attack procedure and an anomaly.

FIG. 7 is a view showing an example of collating conditions stored in the collating condition storing means 14. A collating condition in this example embodiment includes a collating condition ID, an anomaly collating conditional expression, and an event collating conditional expression. The collating condition ID is an identifier for identifying a collating condition. The anomaly collating conditional expression includes a conditional expression related to an anomaly received by the anomaly receiving means 11. The event collating conditional expression includes a conditional expression related to a risk stored in the risk storing means 15.

The collating condition "CC1" contains an anomaly collating conditional expression that matches an anomaly where a value of the key "Anomaly-Type" is "UNUSUAL_MESSAGE", and a value of the key "Target" is "$X". Further, the collating condition "CC1" contains an event collating conditional expression that matches an event where a value of the key "Event-Type" is "TAG_CHANGED_BY_ATTACKER", and a value of the key "Target" is "$X". This "$X" indicates an arbitrary value, and this value needs to be the same between an anomaly and an event.

The collating condition "CC2" contains an anomaly collating conditional expression that matches an anomaly where a value of the key "Anomaly-Type" is "UNUSUAL_LOGIN", and a value of the key "Target" is "$X". Further, the collating condition "CC2" contains an event collating conditional expression that matches an event where a value of the key "Event-Type" is "LOGIN_BY_ATTACKER", and a value of the key "Target" is "$X".

The collating condition "CC3" contains an anomaly collating conditional expression that matches an anomaly where a value of the key "Anomaly-Type" is "TAMPER_DETECTED", and a value of the key "Equipment-Name" is "$X". Further, the collating condition "CC3 contains an event collating conditional expression that matches an event where a value of the key "Event-Type" is "COMPROMISED", and a value of the key "Target" is "$X".

The collating means 12 receives an anomaly from the anomaly receiving means 11 in this example embodiment. The collating means 12 determines whether an anomaly collating conditional expression contained in each collating condition stored in the collating condition storing means 14 matches the anomaly or not. When they match, the collating means 12 further determines whether an event contained in each attack path stored in the risk storing means 15 matches an event collating conditional expression contained in the collating condition. When they match, the collating means 12 passes the attack path that contains the matching event to the extracting means 13.

The details of the operation in the collating means 12 are described hereinafter with reference to a specific example. For example, when the anomaly (1) shown in FIG. 5A is passed from the anomaly receiving means 11, the collating means 12 first determines whether the anomaly collating conditional expression "Anomaly-Type=UNUSUAL_MESSAGE and Target=$X" contained in the collating condition "CC1" stored in the collating condition storing means 14 matches this anomaly (1) or not. Whereas the first term in the anomaly collating conditional expression is "Anomaly-Type=UNUSUAL_MESSAGE", a value of the key "Anomaly-Type" contained in the anomaly (1) is "TAMPER_DETECTED", and therefore it is determined that the anomaly collating conditional expression does not match the anomaly (1).

Next, the collating means 12 determines whether the anomaly collating conditional expression "Anomaly-Type=UNUSUAL_LOGIN and Target=$X" contained in the collating condition "CC2" stored in the collating condition storing means 14 matches this anomaly (1) or not. Whereas the first term in the anomaly collating conditional expression is "Anomaly-Type=UNUSUAL_LOGIN", a value of the key "Anomaly-Type" contained in the anomaly (1) is "TAMPER_DETECTED", and therefore it is determined that the anomaly collating conditional expression does not match the anomaly (1).

Then, the collating means 12 determines whether the anomaly collating conditional expression "Anomaly-Type=TAMPER_DETECTED and Equipment-Name=$X" contained in the collating condition "CC3" stored in the collating condition storing means 14 matches this anomaly (1) or not. The first term in the anomaly collating conditional expression is "Anomaly-Type=TAMPER_DETECTED" and a value of the key "Anomaly-Type" contained in the anomaly (1) is "TAMPER_DETECTED", and therefore the first term in the anomaly collating conditional expression matches the anomaly (1). Further, the second term in the anomaly collating conditional expression is "Equipment-Name=$X", and a value of the key "Equipment-Name" contained in the anomaly (1) is "MV101". Since a value of the above-described "$X" is undetermined, it matches any value. Therefore, the second term in the anomaly collating conditional expression also matches the anomaly (1). Further, at this time, a value of "$X" is determined as "MV101". The first term and the second term in the anomaly collating conditional expression are connected by "and", and both of them match the anomaly (1), and thereby the anomaly collating conditional expression is determined to match the anomaly (1).

When the result is a match, the collating means 12 determines whether an event contained in each attack path stored in the risk storing means 15 matches the event collating conditional expression contained in the collating condition that is determined to match the anomaly (1). Assume for example that four attack paths shown in FIGS. 6A to 6D are stored in the risk storing means 15.

First, the collating means 12 determines whether the event collating conditional expression "Event-Type= COMPROMISED and Target=$X" contained in the collating condition "CC3" and each event in the attack path "AP1" match or not.

Since the first term in the event collating conditional expression is "Event-Type=COMPROMISED" and a value of the key "Event-Type" contained in the first event in the attack path is "COMPROMISED", the first term in the event collating conditional expression matches this event. The second term in the event collating conditional expression is "Target=$X" and a value of the key "Target" contained in the first event in the attack path is "EWS". A value of the above "$X" is defined earlier as "MV101". Thus, the second term in the anomaly collating conditional expression does not match the event. The first term and the second term in the event collating conditional expression are connected by "and", but the second term does not match the event, and therefore the event collating conditional expression is determined not to match the event.

Since the first term in the event collating conditional expression is "Event-Type=COMPROMISED" and a value of the key "Event-Type" contained in the second to eighth events in the attack path is any one of "PASSWORD_STOLEN", "LOGIN_BY_ATTACKER", "TAG_CHANGED_BY_ATTACKER", "SEND_COMMAND", "FUNCTIONED", and "PHYSICALLY_CHANGED", the first term in the event collating conditional expression does not match this event. The first term and the second term in the event collating conditional expression are connected by "and", but the first term does not match the event, and thereby the event collating conditional expression is determined not to match the event.

Next, the collating means 12 determines whether the event collating conditional expression "Event-Type= COMPROMISED and Target=$X" contained in the collating condition "CC3" and each event in the attack path "AP2" match or not.

Since the first term in the event collating conditional expression is "Event-Type=COMPROMISED" and a value of the key "Event-Type" contained in the first event in the attack path is "PHYSICALLY_ACCESSED", the first term in the event collating conditional expression does not match this event. The first term and the second term in the event collating conditional expression are connected by "and", but the first term does not match the event, and therefore the event collating conditional expression is determined not to match the event.

Since the first term in the event collating conditional expression is "Event-Type=COMPROMISED" and a value of the key "Event-Type" contained in the second event in the attack path is "COMPROMISED", the first term in the event collating conditional expression matches this event. The second term in the event collating conditional expression is "Target=$X" and a value of the key "Target" contained in the first event in the attack path is "MV101". A value of the above "$X" is defined earlier as "MV101". Thus, the second term in the anomaly collating conditional expression matches the event. The first term and the second term in the event collating conditional expression are connected by "and", and both of them match the event, and therefore the event collating conditional expression is determined to match the event.

Since the first term in the event collating conditional expression is "Event-Type=COMPROMISED" and a value of the key "Event-Type" contained in the third to fifth events in the attack path is any one of "MALFUNCTIONED", and "PHYSICALLY_CHANGED", the first term in the event collating conditional expression does not match this event. The first term and the second term in the event collating conditional expression are connected by "and", but the first term does not match the event, and thereby the event collating conditional expression is determined not to match the event.

Next, the collating means 12 determines whether the event collating conditional expression "Event-Type=COMPROMISED and Target=$X" contained in the collating condition "CC3" and each event in the attack path "AP3" match or not.

Since the first term in the event collating conditional expression is "Event-Type=COMPROMISED" and a value of the key "Event-Type" contained in the first to sixth events in the attack path is any one of "MALICIOUS_HOST_JOINED", "TAG_CHANGED_BY_ATTACKER", "SEND_COMMAND", "FUNCTIONED", and "PHYSICALLY_CHANGED", the first term in the event collating conditional expression does not match this event. The first term and the second term in the event collating conditional expression are connected by "and", but the first term does not match the event, and thereby the event collating conditional expression is determined not to match the event.

Next, the collating means 12 determines whether the event collating conditional expression "Event-Type= COMPROMISED and Target=$X" contained in the collating condition "CC3" and each event in the attack path "AP4" match or not.

Since the first term in the event collating conditional expression is "Event-Type=COMPROMISED" and a value of the key "Event-Type" contained in the first event in the attack path is "COMPROMISED", the first term in the event collating conditional expression matches this event. The second term in the event collating conditional expression is "Target=$X" and a value of the key "Target" contained in the first event in the attack path is "EWS". A value of the above "$X" is defined earlier as "MV101". Thus, the second term in the anomaly collating conditional expression does not match the event. The first term and the second term in the event collating conditional expression are connected by "and", but the second term does not match the event, and therefore the event collating conditional expression is determined not to match the event.

Since the first term in the event collating conditional expression is "Event-Type=COMPROMISED" and a value of the key "Event-Type" contained in the second to eighth events in the attack path is any one of "PASSWORD_STOLEN", "LOGIN_BY_ATTACKER", "TAG_CHANGED_BY_ATTACKER", "SEND_COMMAND", "FUNCTIONED", and "PHYSICALLY_CHANGED", the first term in the event collating conditional expression does not match this event. The first term and the second term in the event collating conditional expression are connected by "and", but the first term does not match the event, and thereby the event collating conditional expression is determined not to match the event.

As described above, it is determined that the anomaly (1) passed from the anomaly receiving means 11 and the anomaly collating conditional expression contained in the collating condition "CC3" match, and further it is determined that the event collating conditional expression contained in the collating condition "CC3" and the second event in the attack path "AP2" match. Finally, the collating means 12 passes the attack path "AP2" containing the matching event to the extracting means 13.

The extraction condition storing means 16 stores extraction conditions. FIG. 8 shows an example of extraction conditions stored in the extraction condition storing means 16. An extraction condition in this example embodiment includes an extraction condition ID, an event extraction conditional expression, and a label. The extraction condition ID is an identifier for identifying an extraction condition. The event extraction conditional expression includes a conditional expression related to an event to be extracted from an attack path. The label contains a sentence that describes what event is to be extracted by this extraction condition.

The extraction condition "EC1" contains an event extraction conditional expression that extracts an event where a value of the key "Event-Number" in the event falls below "@MATCHED_EVENT_NUMBER". This "@MATCHED_EVENT_NUMBER" is a value of the key "Event-Number" of the event which the collating condition matches. Thus, the event extraction conditional expression matches all of events that occur before the event which the collating condition matches in the attack path.

The extraction condition "EC2" contains an event extraction conditional expression that extracts an event where a value of the key "Event-Number" in the event exceeds "@MATCHED_EVENT_NUMBER". Thus, the event extraction conditional expression matches all of events that occur after the event which the collating condition matches in the attack path.

The extracting means 13 receives an attack path containing an event that matches the collating condition from the collating means 12. Further, the extracting means 13 receives an extraction condition ID specified by a user from an input means (not shown) such as a mouse or a keyboard. Further, the extracting means 13 acquires an extraction condition that is identified by the extraction condition ID from the extraction condition storing means 16. The extracting means then 13 extracts an event that matches the acquired extraction condition from the received attack path, and passes the extracted event to the display means 17.

An operation that extracts an event in the extracting means 13 is described hereinafter in detail with reference to a specific example. For example, assume that the extracting means 13 receives, from the collating means 12, the attack path "AP2" shown in FIG. 6B as an attack path containing the event that matches the collating condition, and the value "2" of the key "Event-Number" of the event that matches the collating condition. Assume also that the extracting means 13 receives the extraction condition ID "EC1" from the input means (not shown). In this case, the extracting means 13 first stores the value "2" of the key "Event-Number" of the event that matches the collating condition in the attack path into an internal storage area, which is not shown. Next, the extracting means 13 acquires, from the extraction condition storing means 16, the extraction condition "EC1" shown in FIG. 8 that is identified by the extraction condition ID "EC1". Then, the extracting means 13 determines whether each event contained in the received attack path satisfies the event extraction conditional expression "Event_Number<@MATCHED_EVENT_NUMBER" contained in the acquired extraction condition. @MATCHED_EVENT_NUMBER is the value "2" of the key "Event-Number" of the event that matches the collating condition in the attack path that is stored in the internal storage area, which is not shown. As a result, the event having "1" as the value of the key "Event-Number" in the attack path is determined to satisfy the event extraction conditional expression. Finally, the extracting means 13 passes the event determined to satisfy the event extraction conditional expression to the display means 17.

Further, for example, assume that the extracting means 13 receives, from the collating means 12, the attack path "AP2" shown in FIG. 6B as an attack path containing the event that matches the collating condition, and the value "2" of the key "Event-Number" of the event that matches the collating condition. Assume also that the extracting means 13 receives the extraction condition ID "EC2" from the input means (not shown). In this case, the extracting means 13 first stores the value "2" of the key "Event-Number" of the event that matches the collating condition in the attack path into an internal storage area, which is not shown. Next, the extracting means 13 acquires, from the extraction condition storing means 16, the extraction condition "EC2" shown in FIG. 8 that is identified by the extraction condition ID "EC2". Then, the extracting means 13 determines whether each event contained in the received attack path satisfies the event extraction conditional expression "Event_Number>@MATCHED_EVENT_NUMBER" contained in the acquired extraction condition. @MATCHED_EVENT_NUMBER is the value "2" of the key "Event-Number" of the event that matches the collating condition in the attack path that is stored in the internal storage area, which is not shown. As a result, the event having "3", "4" and "5" as the value of the key "Event-Number" in the attack path is determined to satisfy the event extraction conditional expression. Finally, the extracting means 13 passes the event determined to satisfy the event extraction conditional expression to the display means 17.

The display means 17 receives the event that matches the collating condition and the event that matches the extraction condition from the extracting means 13, and presents the received events to a user through a display device such as an organic EL display or a liquid crystal display.

Figure 9:
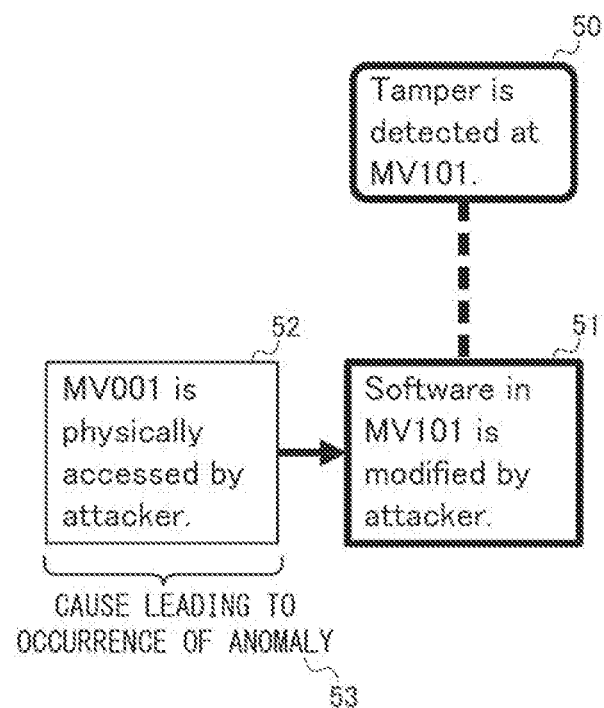
FIG. 9 is a view showing an example of information related to an event presented to a user by a display means according to the example embodiment of the present invention.

For example, assume that the anomaly receiving means 11 receives the anomaly (1), and the collating means 12 determines that this anomaly matches the second event in the attack path "AP2" by the collating condition "CC3". Assume also that the extracting means 13 extracts the first event in the attack path by the extraction condition "EC1" specified by a user. In this case, the display means 17 can present the screen shown in FIG. 9 as an example to the user. An anomaly 50 can be displayed by the display means 17 on the basis of information about an anomaly acquired from the anomaly receiving means 11. As an event 51 that matches the anomaly on the basis of the collating condition and an event 52 that is extracted on the basis of the extraction condition, character strings stored as a value of the key "Label" contained in each event can be displayed. Further, an informative label 53 can be displayed using an informative label contained in the extraction condition. Thus, for an anomaly detected by a monitoring device, (A) causes leading to the occurrence of the anomaly are automatically presented to a person in charge of operation.

Figure 10:
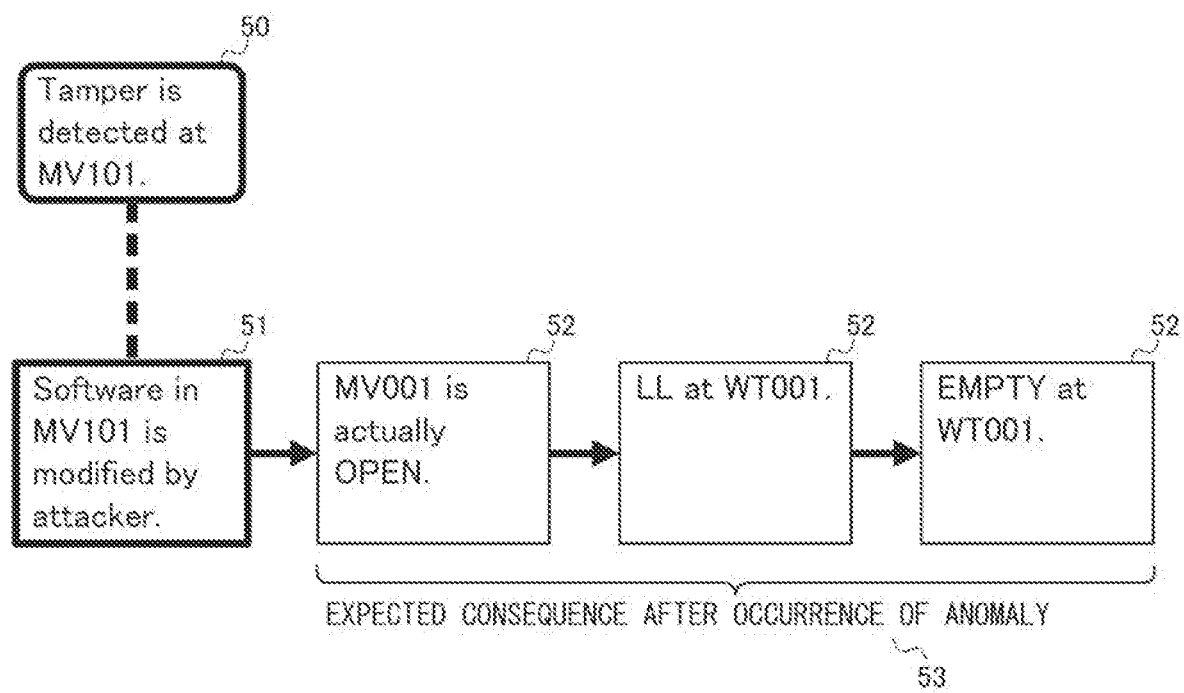
FIG. 10 is a view showing an example of information related to an event presented to a user by the display means according to the example embodiment of the present invention.

For example, assume that the anomaly receiving means 11 receives the anomaly (1), and the collating means 12 determines that this anomaly matches the second event in the attack path "AP2" by the collating condition "CC3". Assume also that the extracting means 13 extracts the third to fifth events in the attack path by the extraction condition "EC2" specified by a user. In this case, the display means 17 can present the screen shown in FIG. 10 as an example to the user. Thus, for an anomaly detected by a monitoring device, (B) expected consequences after the occurrence of the anomaly are automatically presented to a person in charge of operation.

Figure 11:
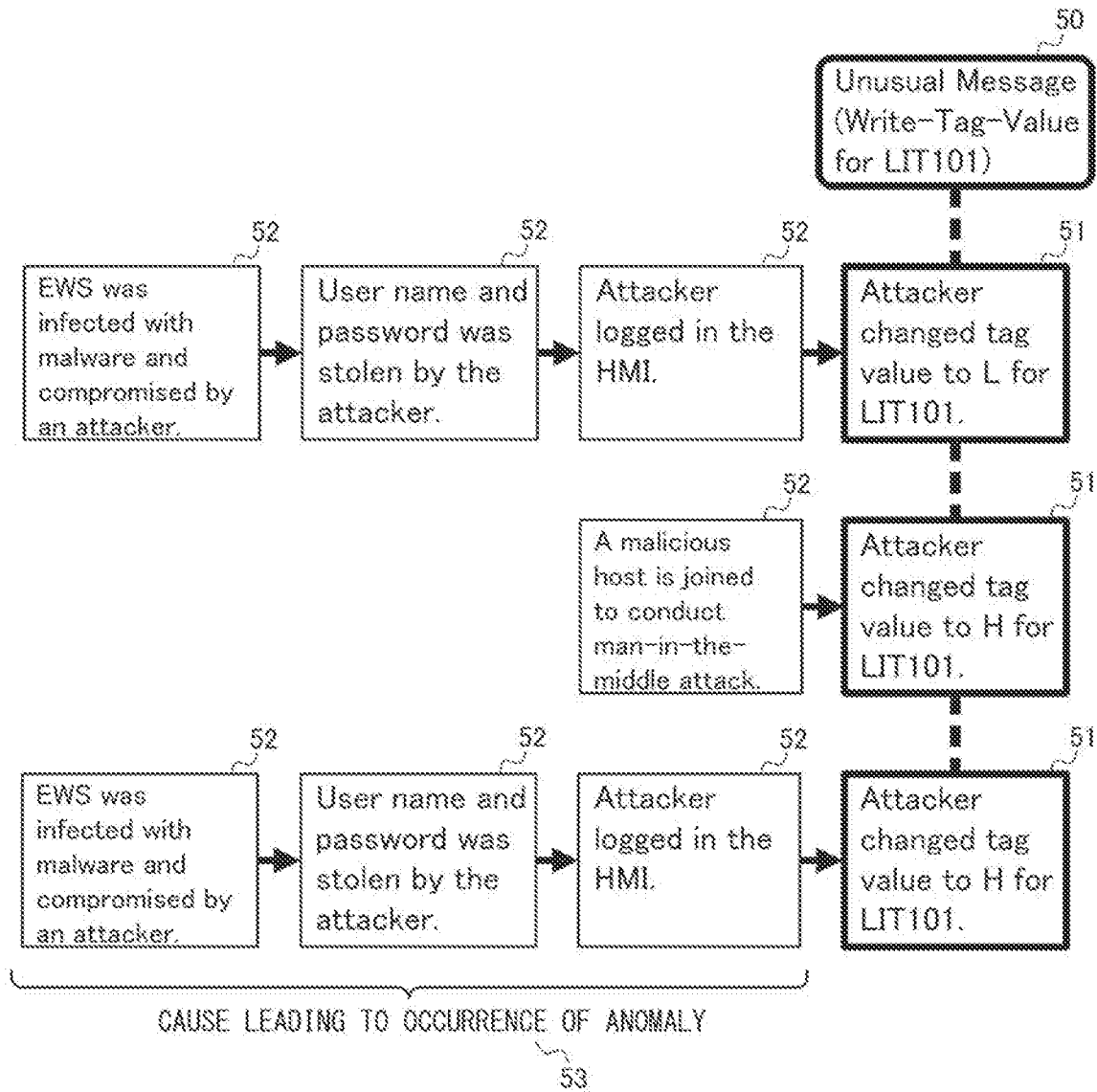
FIG. 11 is a view showing an example of information related to an event presented to a user by the display means according to the example embodiment of the present invention.

For example, assume that the anomaly receiving means 11 receives the anomaly (2), and the collating means 12 determines that this anomaly matches the fourth event in the attack path "AP 1", the second event in the attack path "AP3", and the fourth event in the attack path "AP4" by the collating condition "CC1". Assume also that the extracting means 13 extracts the first to third events in the attack path "AP1", the first event in the attack path "AP3", and the first to third events in the attack path "AP4" by the extraction condition "EC1" specified by a user. In this case, the display means 17 can present the screen shown in FIG. 11 as an example to the user. Thus, for an anomaly detected by a monitoring device, (A) causes leading to the occurrence of the anomaly are automatically presented to a person in charge of operation.

Figure 12:
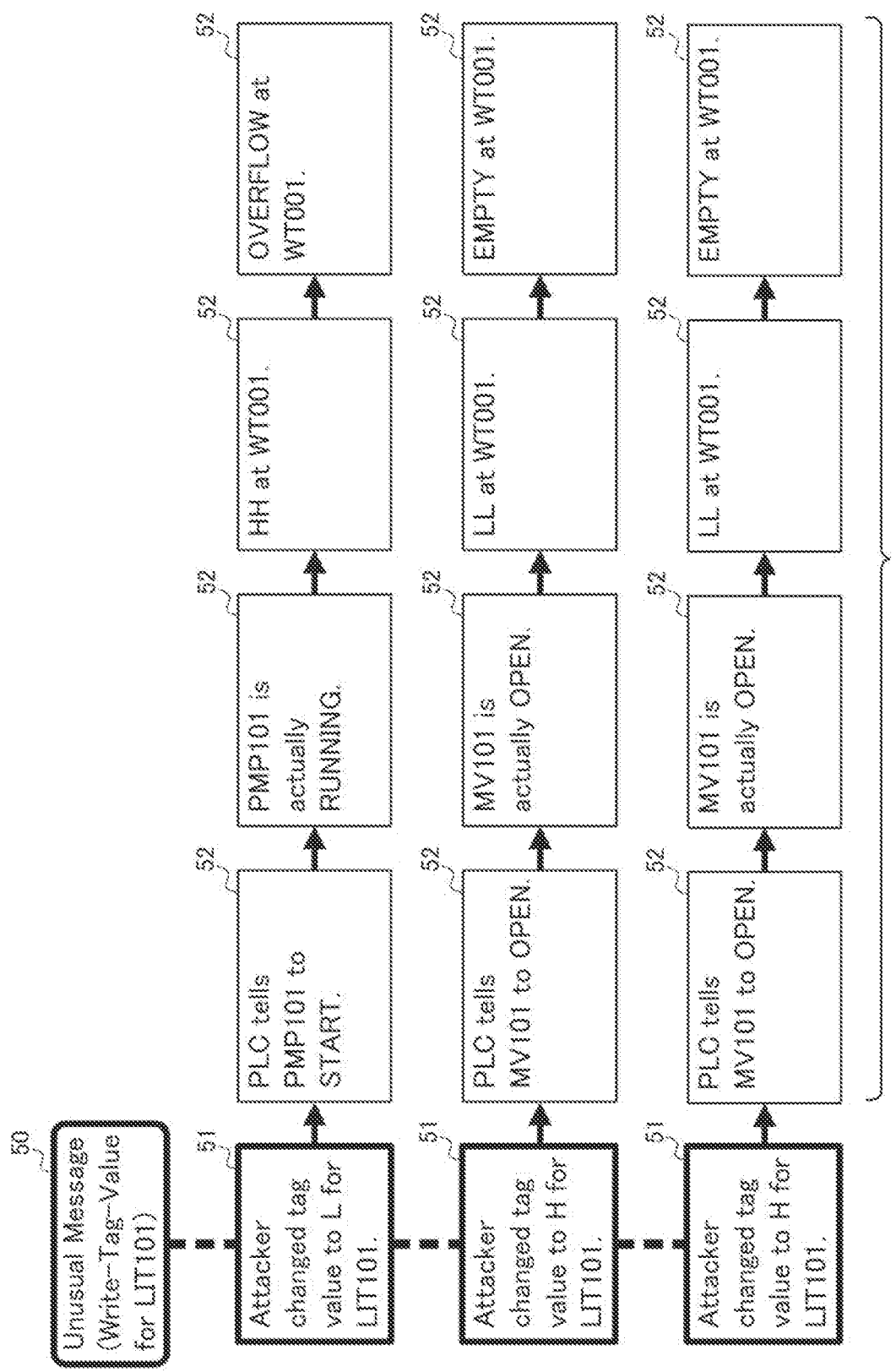
FIG. 12 is a view showing an example of information related to an event presented to a user by the display means according to the example embodiment of the present invention.

For example, assume that the anomaly receiving means 11 receives the anomaly (2), and the collating means 12 determines that this anomaly matches the fourth event in the attack path "AP1", the second event in the attack path "AP3", and the fourth event in the attack path "AP4" by the collating condition "CC1". Assume also that the extracting means 13 extracts the fifth to eighth events in the attack path "AP1", the third to sixth events in the attack path "AP3", and the fifth to eighth events in the attack path "AP4" by the extraction condition "EC2" specified by a user. In this case, the display means 17 can present the screen shown in FIG. 12 as an example to the user. Thus, for an anomaly detected by a monitoring device, (B) expected consequences after the occurrence of the anomaly are automatically presented to a person in charge of operation.

For example, assume that the anomaly receiving means 11 receives the anomaly (2), and the collating means 12 determines that this anomaly matches the fourth event in the attack path "AP1", the second event in the attack path "AP3", and the fourth event in the attack path "AP4" by the collating condition "CC1". Assume also that the extracting means 13 extracts the first to third events in the attack path "AP1", the first event in the attack path "AP3", and the first to third events in the attack path "AP4" by the extraction condition "EC1" specified by a user. In this case, the display means 17 can present the screen shown in FIG. 13 as an example to the user. On this screen, a configuration diagram of each equipment and a network in the plant 20 is displayed by the display means 17. In each event received from the extracting means 13 by the display means 17, an identification name of equipment where this event has occurred in the plant 20 is indicated as a value of the key "Where". The display means 17 draws a symbol representing the order (e.g., a symbol such as an arrow) from equipment where the n-th (n is a positive integer) event occurs to equipment where the (n+1)th event occurs in the configuration diagram. Thus, for an anomaly detected by a monitoring device, the way the influence of an attack by an attacker propagates from equipment to equipment is visually presented to a person in charge of operation, in addition to that (A) causes leading to the occurrence of the anomaly are automatically presented to the person in charge of operation.

For example, assume that the anomaly receiving means 11 receives the anomaly (2), and the collating means 12 determines that this anomaly matches the fourth event in the attack path "AP 1", the second event in the attack path "AP3", and the fourth event in the attack path "AP4" by the collating condition "CC1". Assume also that the extracting means 13 extracts the fifth to eighth events in the attack path "AP1", the third to sixth events in the attack path "AP3", and the fifth to eighth events in the attack path "AP4" by the extraction condition "EC2" specified by a user. In this case, the display means 17 can present the screen shown in FIG. 14 as an example to the user. On this screen, a configuration diagram of each equipment and a network in the plant 20 is displayed by the display means 17. In each event received from the extracting means 13 by the display means 17, an identification name of equipment where this event has occurred in the plant 20 is indicated as a value of the key "Where". The display means 17 draws a symbol representing the order (e.g., an arrow) from equipment where the n-th event occurs to equipment where the (n+1)th event occurs in the configuration diagram. Thus, for an anomaly detected by a monitoring device, the way the influence of an attack by an attacker propagates from equipment to equipment is visually presented to the person in charge of operation, in addition to that (B) expected consequences after the occurrence of the anomaly are automatically presented to a person in charge of operation.

Figure 13:
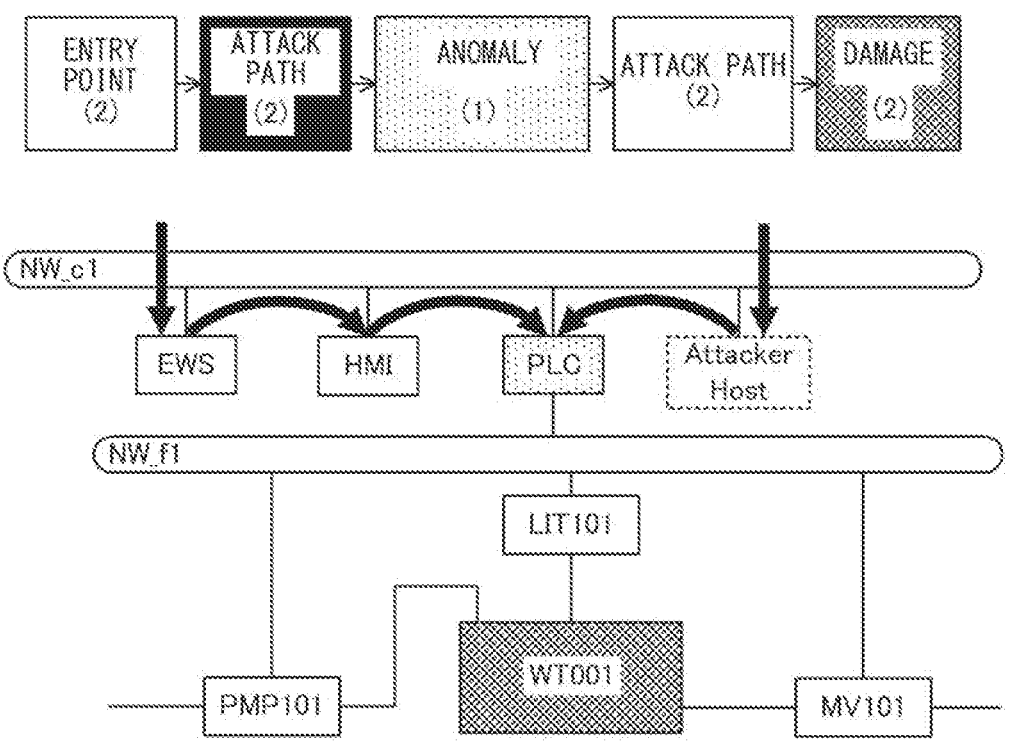
FIG. 13 is a view showing an example of information related to an event presented to a user by the display means according to the example embodiment of the present invention.
Figure 14:
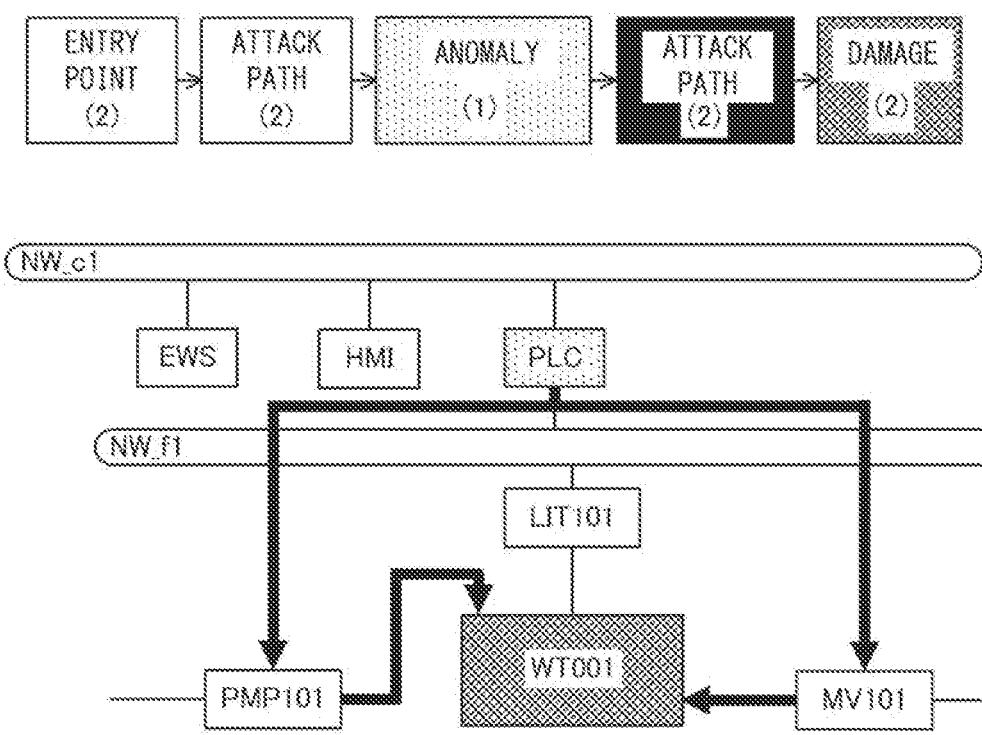
FIG. 14 is a view showing an example of information related to an event presented to a user by the display means according to the example embodiment of the present invention.

Further, since arrows or the like drawn on the screen can overlap, the display means 17 may display the number of anomalies received by the anomaly receiving means, the number of attack paths to which the event passed from the extracting means 13 belongs (on the left of "anomaly" for the extraction condition EC1; on the right of "anomaly" for the extraction condition EC2), the number of first events (entry points) in the attack path, and the number of final events (damages) in the attack path as shown in the upper part of FIGS. 13 and 14.

[Device Operation]

Figure 15:
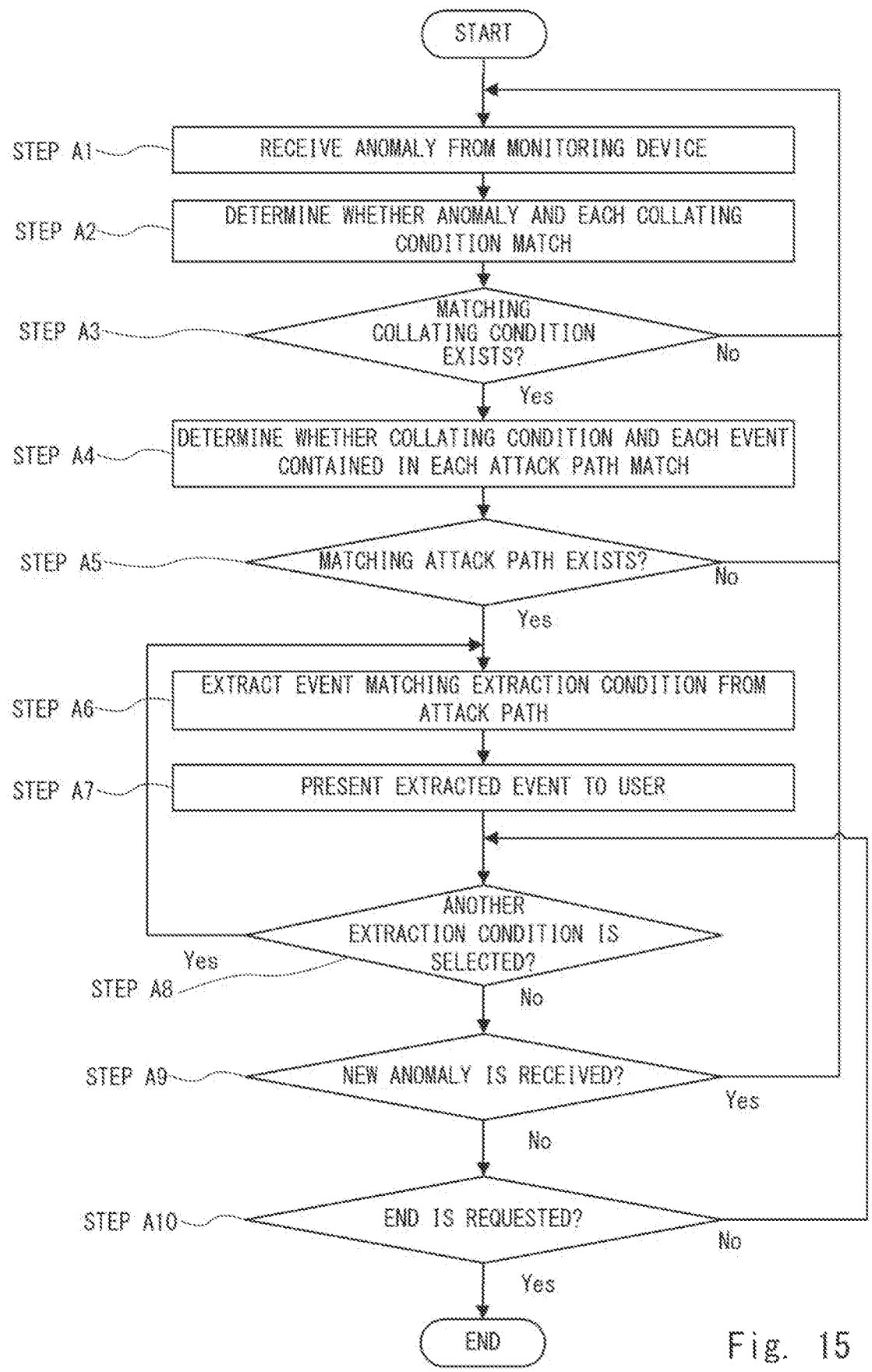
FIG. 15 is a flowchart showing an operation of an information processing device 10 according to the example embodiment of the present invention.

An operation of the information processing device 10 according to this example embodiment is described hereinafter with reference to FIG. 15. FIG. 15 is a flowchart showing an operation of an information processing device according to an example embodiment of the present invention. The following description refers to FIGS. 1 to 14 when needed. Further, in this example embodiment, a display method is implemented by causing the information processing device 10 to operate. Therefore, the following description of the operation of the information processing device 10 is considered a substitute for the description of the display method according to this example embodiment.

First, the anomaly receiving means 11 receives an anomaly detected by the monitoring device 40, and passes the received anomaly to the collating means (Step A1).

Next, the collating means 12 determines whether the passed anomaly and each collating condition acquired from the collating condition storing means 14 match or not (Step A2).

Then, the collating means 12 determines whether there is a collating condition that is determined to match the anomaly in the previous Step A2. When it is determined that there is a collating condition determined to match the anomaly, the following Step A4 is performed. When, on the other hand, there is no collating condition determined to match the anomaly, the Step A1 is performed (Step A3).

Then, the collating means 12 determines whether the collating condition determined to match the anomaly and each event in each attack path acquired from the risk storing means 15 match or not (Step A4).

After that, the collating means 12 determines whether there is an attack path containing the event determined to match the collating condition in the previous Step A4. When it is determined that there is an attack path containing the event determined to match the collating condition, the collating means 12 passes the attack path containing the matching event to the extracting means 13, and the following Step A6 is performed. When, on the other hand, there is no attack path containing the event determined to match the collating condition, the Step A1 is performed (Step A5).

Then, the extracting means 13 receives the attack path containing the event that matches the collating condition. The extracting means 13 also receives an extraction condition ID specified by a user from an input means (not shown) such as a mouse or a keyboard. Further, the extracting means 13 acquires an extraction condition that is identified by this extraction condition ID from the extraction condition storing means 16. The extracting means 13 then extracts an event that matches the acquired extraction condition from the received attack path, and passes the extracted event to the display means 17 (Step A6).

Then, the display means 17 receives the event that matches the collating condition and the event that matches the extraction condition from the extracting means 13, and presents the received events to a user through a display device such as an organic EL display or a liquid crystal display (Step A7).

Then, the display means 17 determines whether another extraction condition is selected by a user. When it is determined that another extraction condition is selected, the Step A6 is performed. When, on the other hand, another extraction condition is not selected, the following Step A9 is performed (Step A8).

After that, the anomaly receiving means 11 determines whether a new anomaly is received from the monitoring device 40. When it is determined that a new anomaly is received from the monitoring device 40, the Step A1 is performed. When, on the other hand, a new anomaly is not received from the monitoring device 40, the following Step A10 is performed (Step A9).

The display means 17 then determines whether end is requested from the user or not. When it is determined that end is requested, this operation flow ends. When, on the other hand, end is not requested, the following Step A8 is performed (Step A10).

As described above, according to this example embodiment, for an anomaly detected by a monitoring device, (A) causes leading to the occurrence of the anomaly and (B) expected consequences after the occurrence of the anomaly are automatically presented to a person in charge of operation. Therefore, when a monitoring device detects an anomaly, the person in charge of operation is able to more promptly determine the level of risk that is actually about to occur in a control system and also reduce the possibility of making a wrong determination.

[Program]

A program according to this example embodiment may be a program that causes a computer to execute Steps A1 to A10 shown in FIG. 15. By installing this program into a computer and executing this program, the information processing device and the display method according to this example embodiment are implemented. In this case, a processor of the computer functions as the anomaly receiving means 11, the collating means 12, the extracting means 13 and the display means 17 and perform processing. Further, the collating condition storing means 14, the risk storing means 15 and the extraction condition storing means 16 are implemented by storing data files of collating conditions, attack paths, and extraction conditions into a storage device such as a hard disk in the computer.

Further, the program according to this example embodiment may be executed by a computer system composed of a plurality of computers. In this case, each of the computers may function as any one of the anomaly receiving means 11, the collating means 12, the extracting means 13 and the display means 17. Further, the collating condition storing means 14, the risk storing means 15 and the extraction condition storing means 16 may be implemented in a computer different from the computer that executes the program according to this example embodiment.

Figure 16:
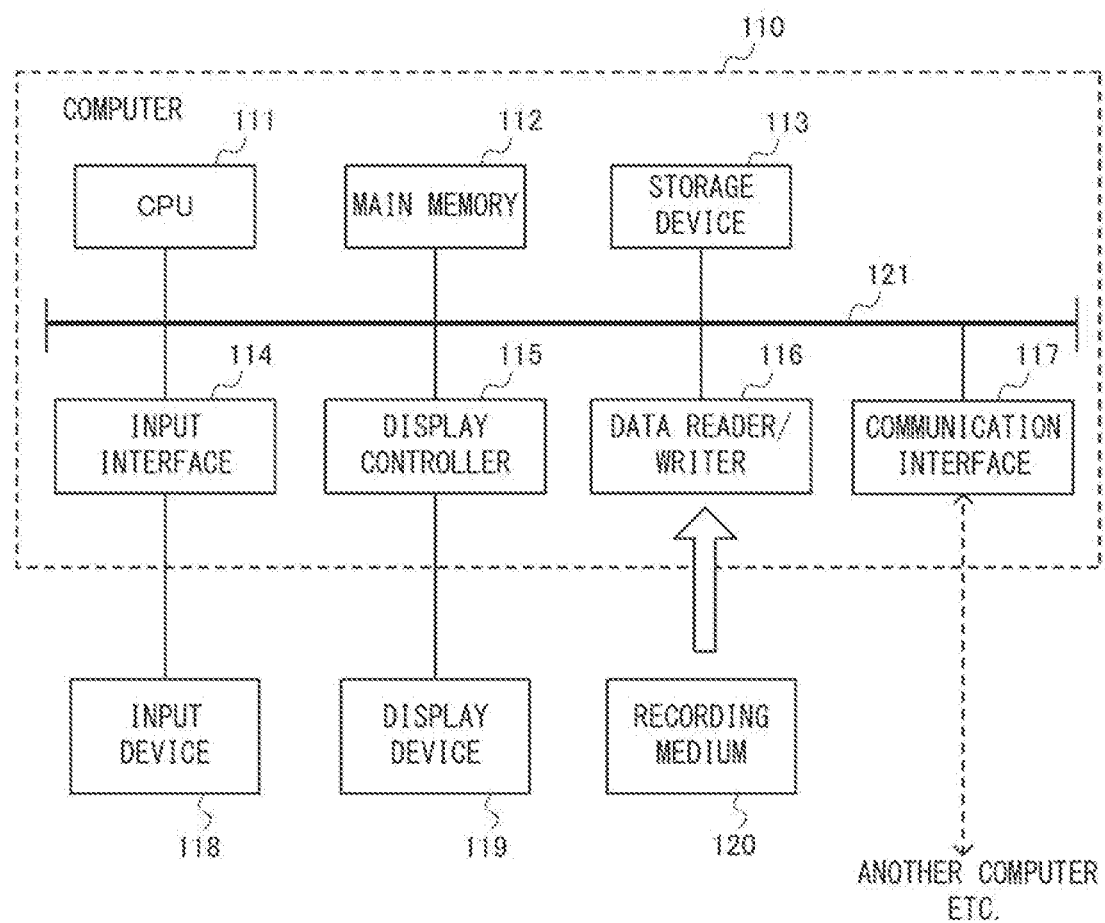
FIG. 16 is a block diagram showing an example of a computer that implements the information processing device 10 according to the example embodiment of the present invention.

A computer that implements the information processing device 10 by executing the program according to this example embodiment is described hereinafter with reference to FIG. 16. FIG. 16 is a block diagram showing an example of a computer that implements the information processing device 10 according to an embodiment of the present invention.

As shown in FIG. 16, a computer 110 includes a CPU (Central Processing Unit) 111, a main memory 112, a storage device 113, an input interface 114, a display controller 115, a data reader/writer 116, and a communication interface 117. Those elements are connected for data communication through a bus 121. Note that the computer 110 may include a GPU (Graphics Processing Unit) or an FPGA (Field-Programmable Gate Array) in addition to or in place of the CPU 111.

The CPU 111 performs various computations by expanding the program (codes) according to this example embodiment stored in the storage device 113 in the main memory 112 and executing them in a predetermined order. The main memory 112 is typically a volatile storage device such as a DRAM (Dynamic Random Access Memory). The program according to this example embodiment is provided in the state of being stored in a computer-readable recording medium 120. The program according to this example embodiment may be distributed through the Internet that is connected via the communication interface 117.

As described above, the program can be stored and provided to a computer using any type of non-transitory computer readable medium. Non-transitory computer readable media include any type of tangible storage medium. Examples of the non-transitory computer readable media include magnetic storage media (such as flexible disks, magnetic tapes, hard disk drives, etc.), and optical magnetic storage media (e.g. magneto-optical disks), Compact Disc Read Only Memory (CD-ROM), CD-R, and CD-R/W, semiconductor memories (e.g., mask ROM, Programmable ROM (PROM), Erasable PROM (EPROM), flash ROM, and Random Access Memory (RAM)). The program may be provided to a computer using any type of transitory computer readable medium. Examples of transitory computer readable media include electric signals, optical signals, and electromagnetic waves. The transitory computer readable medium can provide the program to a computer via a wired communication line such as an electric wire or an optical fiber, or a wireless communication line.

A specific example of the storage device 113 is a semiconductor storage device such as or a flash memory, besides a hard disk device. The input interface 114 relays data transmission between the CPU 111 and an input device 118 such as a keyboard and a mouse. The display controller 115 is connected to a display device 119 and controls display on the display device 119.

The data reader/writer 116 relays data transmission between the CPU 111 and the recording medium 120 and executes reading of a program from the recording medium 120 and writing of processing results in the computer device 110 to the recording medium 120. The communication interface 117 relays data transmission between the CPU 111 and another computer.

Specific examples of the recording medium 120 include general-purpose semiconductor storage devices such as CF (Compact Flash (registered trademark)) and SD (Secure Digital), magnetic recording media such as a flexible disk, and optical recording media such as CD-ROM (Compact Disk Read Only Memory).

Note that the information processing device 10 according to this example embodiment may be implemented by hardware corresponding to each component rather than a computer into which the program is installed. Further, a part of the information processing device 10 may be implemented by the program, and a remaining part may be implemented by hardware.

Second Example Embodiment

An information processing device according to a second example embodiment of the present invention is described hereinafter. A specific configuration of the information processing device according to the second example embodiment of the present invention is the same as the configuration shown in FIG. 4. Differences of an information processing device 10 according to the second example embodiment of the present invention from the above-described example embodiment of the present invention are described hereinbelow.

The risk storing means 15 stores risks that can occur in the plant 20. A risk in this example embodiment is written as a fault tree. Specifically, in this example embodiment, an attack procedure is written as a fault tree. The fault tree is information where events that can occur when the plant 20 encounters a cyberattack are arranged according to the relationship of cause and consequence. The fault tree in this example embodiment is created by an expert for security and control systems who examines the vulnerability of each equipment in the plant 20 and studies all possible cases that damage the plant 20 by abusing the vulnerability.

Each event in the fault tree has an identification number "300" of this event as a value of the key "Event-Number". Further, it may have the identification number "298" of an event that has caused this event as a value of the key "Cause". When a cause of this event is the logical disjunction or logical conjunction of a plurality of events, it can be written as "297 and 299" etc. or "297 or 299" etc. Further, it may have the identification number "301" etc. of an event that occurs as a consequence of the occurrence of this event as a value of the key "Consequence".

In this example embodiment, the collating means 12 receives an anomaly from the anomaly receiving means 11. The collating means 12 then determines whether an anomaly collating conditional expression contained in each collating condition stored in the collating condition storing means 14 matches the anomaly or not. When they match, the collating means 12 further determines whether an event contained in each fault tree stored in the risk storing means 15 matches an event collating conditional expression contained in the collating condition. When they match, the collating means 12 passes the fault tree that contains the matching event to the extracting means 13.

The extraction condition storing means 16 stores extraction conditions. An event extraction conditional expression in an extraction condition includes a conditional expression related to an event extracted from a fault tree. An event extraction conditional expression that extracts an event that is a cause leading to the occurrence of an anomaly may be written as "@MATCHED_EVENT_NUMBER in Consequence", for example. "@MATCHED_EVENT_NUMBER in Consequence" indicates whether a value specified by "@MATCHED_EVENT_NUMBER" is contained in a value of the key "Consequence". Further, an event extraction conditional expression that extracts an event that is an expected consequence after the occurrence of an anomaly may be written as "@MATCHED_EVENT_NUMBER in Cause", for example. "@MATCHED_EVENT_NUMBER in Cause" indicates whether a value specified by "@MATCHED_EVENT_NUMBER" is contained in a value of the key "Cause".

The extraction means extracts an event that matches the extraction condition from the fault tree.

As described above, in this example embodiment, even when a fault tree is stored in the risk storing means 15 as risks that can occur in the plant 20, for an anomaly detected by a monitoring device, (A) causes leading to the occurrence of the anomaly and (B) expected consequences after the occurrence of the anomaly are automatically presented to a person in charge of operation. Therefore, when a monitoring device detects an anomaly, the person in charge of operation is able to more promptly determine the level of risk that is actually about to occur in a control system and also reduce the possibility of making a wrong determination.

The whole or part of the example embodiments disclosed above can be described as, but not limited to, the following supplementary notes.

(Supplementary Note 1)

An information processing device comprising:

an anomaly receiving means for receiving an anomaly detected by a monitoring device installed in a control system;

a collating means for receiving the anomaly from the anomaly receiving means, making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and an extracting means for extracting an event matching a predetermined extraction condition from the specified attack procedure.

(Supplementary Note 2)

The information processing device according to Supplementary Note 1, wherein the extraction condition includes one of a condition for extracting an event occurring before an event corresponding to the anomaly in the attack procedure and a condition for extracting an event occurring after an event corresponding to the anomaly in the attack procedure.

(Supplementary Note 3)

The information processing device according to Supplementary Note 1 or 2, further comprising:

a display means for presenting the extracted event to a user.

(Supplementary Note 4)

The information processing device according to Supplementary Note 3, wherein the display means displays a configuration diagram showing equipment and a network in the control system and further draws, on the configuration diagram, a symbol representing an order from equipment where the extracted n-th event occurs to equipment where the extracted (n+1)th event occurs.

(Supplementary Note 5)

The information processing device according to any one of Supplementary Notes 1 to 4, wherein the attack procedure is an attack path.

(Supplementary Note 6)

The information processing device according to any one of Supplementary Notes 1 to 4, wherein the attack procedure is a fault tree.

(Supplementary Note 7)

A display method comprising:
- (a) receiving an anomaly detected by a monitoring device installed in a control system;
- (b) receiving the received anomaly, making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and
- (c) extracting an event matching a predetermined extraction condition from the specified attack procedure.

(Supplementary Note 8)

The display method according to Supplementary Note 7, wherein the extraction condition includes one of a condition for extracting an event occurring before an event corresponding to the anomaly in the attack procedure and a condition for extracting an event occurring after an event corresponding to the anomaly in the attack procedure.

(Supplementary Note 9)

The display method according to Supplementary Note 7 or 8, further comprising:
- (d) presenting the extracted event to a user.

(Supplementary Note 10)

The display method according to Supplementary Note 9, wherein in the step (d), a configuration diagram showing equipment and a network in the control system is displayed and further, on the configuration diagram, a symbol representing an order from equipment where the extracted n-th event occurs to equipment where the extracted (n+1)th event occurs is drawn.

(Supplementary Note 11)

The display method according to any one of Supplementary Notes 7 to 10, wherein the attack procedure is an attack path.

(Supplementary Note 12)

The display method according to any one of Supplementary Notes 7 to 10, wherein the attack procedure is a fault tree.

(Supplementary Note 13)

A non-transitory computer readable medium storing a program containing instructions causing a computer to execute:
- (a) a step of receiving an anomaly detected by a monitoring device installed in a control system;
- (b) a step of receiving the received anomaly, making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and
- (c) a step of extracting an event matching a predetermined extraction condition from the specified attack procedure.

(Supplementary Note 14)

The non-transitory computer readable medium according to Supplementary Note 13, wherein the extraction condition includes one of a condition for extracting an event occurring before an event corresponding to the anomaly in the attack procedure and a condition for extracting an event occurring after an event corresponding to the anomaly in the attack procedure.

(Supplementary Note 15)

The non-transitory computer readable medium according to Supplementary Note 13 or 14, the program further containing an instruction causing the computer to execute:
- (d) a step of presenting the extracted event to a user.

(Supplementary Note 16)

The non-transitory computer readable medium according to Supplementary Note 15, wherein, in the step (d), a configuration diagram showing equipment and a network in the control system is displayed and further, on the configuration diagram, a symbol representing an order from equipment where the extracted n-th event occurs to equipment where the extracted (n+1)th event occurs is drawn.

(Supplementary Note 17)

The non-transitory computer readable medium according to any one of Supplementary Notes 13 to 16, wherein the attack procedure is an attack path.

(Supplementary Note 18)

The non-transitory computer readable medium according to any one of Supplementary Notes 13 to 16, wherein the attack procedure is a fault tree.

Although the present invention is described above with reference to the example embodiment, the present invention is not limited to the above-described example embodiment. Various changes and modifications as would be obvious to one skilled in the art may be made to the structure and the details of the present disclosure without departing from the scope of the invention.

INDUSTRIAL APPLICABILITY

As described above, according to the present invention, when various types of monitoring devices installed in a control system detect an anomaly, it is capable of supporting a person in charge of operation who is to determine the level of risk that is about to occur in the control system. The present invention is effective for use in various types of plants in which monitoring devices are installed.

REFERENCE SIGNS LIST

10 INFORMATION PROCESSING DEVICE
11 ANOMALY RECEIVING MEANS
12 COLLATING MEANS
13 EXTRACTING MEANS
14 COLLATING CONDITION STORING MEANS
15 RISK STORING MEANS
16 EXTRACTION CONDITION STORING MEANS
17 DISPLAY MEANS
20 PLANT
21 WATER STORAGE TANK

22 WATER LEVEL SENSOR
23 SUPPLY LINE
24 DRAIN LINE
25 PUMP
26 VALVE
30 PLC
31 TERMINAL DEVICE
32 NETWORK SWITCH
33 ENGINEERING WORK STATION
40 MONITORING DEVICE
50 ANOMALY
51 EVENT MATCHING ANOMALY BASED ON COLLATING CONDITION
52 EVENT EXTRACTED BASED ON EXTRACTION CONDITION
53 INFORMATIVE LABEL
110 COMPUTER
111 CPU
112 MAIN MEMORY
113 STORAGE DEVICE
114 INPUT INTERFACE
115 DISPLAY CONTROLLER
116 DATA READER/WRITER
117 COMMUNICATION INTERFACE
118 INPUT EQUIPMENT
119 DISPLAY DEVICE
120 RECORDING MEDIUM
121 BUS

What is claimed is:

1. An information processing device comprising:
at least one memory storing instructions; and
at least one processor configured to execute the instructions stored in the memory to:
receive an anomaly detected by a monitoring device installed in a control system;
make a first determination to determine whether the anomaly matches each of predetermined collating conditions for collating an event contained in an attack procedure and the anomaly, and when the first determination results in a match, make a further second determination to determine whether an event contained in each of predefined attack procedures matches the collating condition determined to match the anomaly, and when the second determination results in a match, specify an attack procedure containing the event; and
extract an event matching a predetermined extraction condition from the specified attack procedure.

2. The information processing device according to claim 1, wherein the extraction condition includes one of a condition for extracting an event occurring before an event corresponding to the anomaly in the attack procedure and a condition for extracting an event occurring after an event corresponding to the anomaly in the attack procedure.

3. The information processing device according to claim 1, further comprising:
the processor is further configured to execute the instructions to present the extracted event to a user.

4. The information processing device according to claim 3, wherein the processor is further configured to execute the instructions to display a configuration diagram showing equipment and a network in the control system and further draw, on the configuration diagram, a symbol representing an order from equipment where the extracted n-th event occurs to equipment where the extracted (n+1)th event occurs.

5. The information processing device according to claim 1, wherein the attack procedure is an attack path.

6. The information processing device according to claim 1, wherein the attack procedure is a fault tree.

7. A display method comprising:
(a) receiving an anomaly detected by a monitoring device installed in a control system;
(b) making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and
(c) extracting an event matching a predetermined extraction condition from the specified attack procedure.

8. The display method according to claim 7, wherein the extraction condition includes one of a condition for extracting an event occurring before an event corresponding to the anomaly in the attack procedure and a condition for extracting an event occurring after an event corresponding to the anomaly in the attack procedure.

9. The display method according to claim 7, further comprising:
(d) presenting the extracted event to a user.

10. The display method according to claim 9, wherein in the step (d), a configuration diagram showing equipment and a network in the control system is displayed and further, on the configuration diagram, a symbol representing an order from equipment where the extracted n-th event occurs to equipment where the extracted (n+1)th event occurs is drawn.

11. The display method according to claim 7, wherein the attack procedure is an attack path.

12. The display method according to claim 7, wherein the attack procedure is a fault tree.

13. A non-transitory computer readable medium storing a program containing instructions causing a computer to execute:
(a) a step of receiving an anomaly detected by a monitoring device installed in a control system;
(b) a step of making a first determination to determine whether the anomaly matches each of predetermined collating conditions for collating an event contained in an attack procedure and the anomaly, and when the first determination results in a match, making a further second determination to determine whether an event contained in each of predefined attack procedures matches the collating condition determined to match the anomaly, and when the second determination results in a match, specifying an attack procedure containing the event; and
(c) a step of extracting an event matching a predetermined extraction condition from the specified attack procedure.

14. The non-transitory computer readable medium according to claim 13, wherein the extraction condition includes one of a condition for extracting an event occurring before an event corresponding to the anomaly in the attack procedure and a condition for extracting an event occurring after an event corresponding to the anomaly in the attack procedure.

15. The non-transitory computer readable medium according to claim 13, the program further containing an instruction causing the computer to execute:
(d) a step of presenting the extracted event to a user.

16. The non-transitory computer readable medium according to claim 15, wherein, in the step (d), a configuration diagram showing equipment and a network in the control system is displayed and further, on the configuration diagram, a symbol representing an order from equipment where the extracted n-th event occurs to equipment where the extracted (n+1)th event occurs is drawn.

17. The non-transitory computer readable medium according to claim 13, wherein the attack procedure is an attack path.

18. The non-transitory computer readable medium according to claim 13, wherein the attack procedure is a fault tree.

* * * * *